(12) United States Patent
Kodaypak et al.

(10) Patent No.: US 10,219,198 B2
(45) Date of Patent: Feb. 26, 2019

(54) SYSTEM AND METHOD FOR SHORT MESSAGE DELIVERY IN A MOBILITY NETWORK

(71) Applicant: AT&T INTELLECTUAL PROPERTY I, LP, Atlanta, GA (US)

(72) Inventors: Rajendra Prasad Kodaypak, Sammamish, WA (US); Christopher Bryant, Duvall, WA (US); Ryan Redfern, Cerritos, CA (US); Jiansong Wang, Parlin, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 296 days.

(21) Appl. No.: 15/163,206

(22) Filed: May 24, 2016

(65) Prior Publication Data
US 2017/0347304 A1 Nov. 30, 2017

(51) Int. Cl.
*H04W 40/02* (2009.01)
*H04W 4/00* (2018.01)
(Continued)

(52) U.S. Cl.
CPC ............ *H04W 40/02* (2013.01); *H04L 67/303* (2013.01); *H04W 4/14* (2013.01); *H04W 4/70* (2018.02);
(Continued)

(58) Field of Classification Search
CPC ..... H04W 4/70; H04W 40/02; H04W 64/003; H04W 4/005; H04W 4/14; H04L 67/303
See application file for complete search history.

(56) References Cited

U.S. PATENT DOCUMENTS

| 7,773,993 | B2 | 8/2010 | Gallagher et al. |
| 7,940,751 | B2 * | 5/2011 | Hansen ................ H04W 28/18 370/354 |

(Continued)

FOREIGN PATENT DOCUMENTS

| AU | 690924 B2 | 5/1998 |
| AU | 2010200639 B2 | 10/2011 |

(Continued)

OTHER PUBLICATIONS

"Standardized Machine-to-Machine and Internet of Things Service Delivery Platform (M2M/IoT SDP)", http://wpuploads.interdigital.com.s3.amazonaws.com/uploads/2012/07/M2M-Platform-WhitePaper.pdf, Discloses a platform that provides a standard M2M middleware solution featuring protocol translation if M2M Area Network management protocol is different from management protocol on the network side., 2013.

(Continued)

Primary Examiner — Gbemileke J Onamuti
(74) Attorney, Agent, or Firm — Guntin & Gust, PLC; Ralph Trementozzi

(57) ABSTRACT

Aspects of the subject disclosure may include, for example, identifying a machine-type communication message directed to a mobile station and determining a compatibility of the mobile station with a 3GPP IMS architecture. In response to determining that the mobile station is compatible with the 3GPP IMS architecture, a forwarding is facilitated of the machine-type communication message to the mobile station via a network element of an IMS network core. In response to determining that the mobile station is not compatible with the 3GPP IMS architecture a forwarding is facilitated of the machine-type communication message to a machine-type communication, interworking function associated with the mobile station, wherein the machine-type communication, interworking function facilitates a directing (Continued)

of the machine-type communication message to the mobile station via an SGs interface of a mobility management entity of an evolved packet core of a 3GPP long term evolution network. Other embodiments are disclosed.

20 Claims, 9 Drawing Sheets

(51) Int. Cl.
*H04W 64/00* (2009.01)
*H04W 80/04* (2009.01)
*H04W 4/70* (2018.01)
*H04L 29/08* (2006.01)
*H04W 4/14* (2009.01)
*H04L 29/06* (2006.01)

(52) U.S. Cl.
CPC ....... *H04W 64/003* (2013.01); *H04L 65/1016* (2013.01); *H04W 80/04* (2013.01)

(56) References Cited

U.S. PATENT DOCUMENTS

| | | | |
|---|---|---|---|
| 8,046,381 B2 | 10/2011 | Cai et al. | |
| 8,223,753 B2 | 7/2012 | Hu et al. | |
| 8,358,647 B2 | 1/2013 | Mahdi et al. | |
| 8,503,391 B2 | 8/2013 | Mahdi et al. | |
| 8,520,682 B2 | 8/2013 | Mahdi et al. | |
| 8,676,217 B2 | 3/2014 | Bolin et al. | |
| 8,713,634 B2 | 4/2014 | Beyer et al. | |
| 9,025,445 B2 | 5/2015 | Jain et al. | |
| 9,094,790 B2 | 7/2015 | Foti et al. | |
| 9,769,788 B2 * | 9/2017 | Jha .................. | H04W 68/005 |
| 2006/0098598 A1 | 5/2006 | Gallagher et al. | |
| 2007/0100981 A1 | 5/2007 | Adamczyk et al. | |
| 2009/0017796 A1 | 1/2009 | Foti et al. | |
| 2012/0072601 A1 | 3/2012 | Bharadwaj et al. | |
| 2013/0279373 A1 | 10/2013 | Ding et al. | |
| 2014/0128113 A1 * | 5/2014 | Zisimopoulos ......... | H04W 4/70 |
| | | | 455/466 |
| 2014/0286162 A1 | 9/2014 | Kim et al. | |
| 2014/0307632 A1 | 10/2014 | Kim et al. | |
| 2015/0195717 A1 | 7/2015 | Jain | |

FOREIGN PATENT DOCUMENTS

| | | |
|---|---|---|
| CA | 2800608 A1 | 11/2011 |
| EP | 2550817 A2 | 1/2013 |
| WO | 2000056091 | 9/2000 |
| WO | 2014002355 A1 | 1/2014 |

OTHER PUBLICATIONS

Drolet, Daniel , "Rapidly integrate Ethernet for M2M using existing RS-485 networks", http://www.pcntechnology.com/rapidly-integrate-ethernet-for-m2m-using-existing-rs485-networks.html, Discloses an article discussing a multi-drop network architecture that allows for the upgrade of existing serial networking infrastructure without impacting functionality, performance or reliability of the existing legacy operations., 2012.

Holler, Jan , "Having a headache using legacy IoT devices?", http://www.ericsson.com/research-blog/internet-of-things/headache-using-legacy-iot-devices/, Discloses the IETF CoRE working group that normalizes legacy devices to make them appear as "proper" IoT devices through wrapping to describe the exposed resources., 2012.

Noldus, Rogier , ""Multi-access for the IMS network"", http://www.ericsson.com/ericsson/corpinfo/publications/review/2008_02/files/7_IMA.pdf, Discloses the IMS multi-access (IMA) that facilitates non-IMS access to the IMS core network and IMS services. Services are provided to non-IMS devices without the requirement to deploy new terminals., 2008.

* cited by examiner

100

200

300

400

SYSTEM AND METHOD FOR SHORT MESSAGE DELIVERY IN A MOBILITY NETWORK

FIELD OF THE DISCLOSURE

The subject disclosure relates to a system and method for short message delivery in a mobility network.

BACKGROUND

Converged IP messaging provides mobile network operators with an opportunity to transform their messaging core networks by capping investments in legacy infrastructure, while supporting messaging, including multimedia rich communications, applications and services intelligently across multiple radio access networks. With greater applications related to the Internet of Things (IoT), it is understood that any changes to messaging core networks would also support a multitude of M2M capable devices. Mobile operators looking to retire legacy access networks, e.g., 3G and/or 2G, may choose to re-allocate radio frequency spectrum to other access networks, such as Long Term Evolution (LTE) and LTE-Advanced (LTE-A) technologies according to $3^{rd}$ Generation Partnership Project (3GPP®standards. 3GPP is a registered trademark of the European Telecommunications Standards Institute, Valbonne France.

While there are several business cases for operators around the globe to utilize such high-speed mobility solutions, these could vary from one operator to another depending on their spectrum availability, current mobility infrastructure, competitiveness in the mobility services offering, market economics, social networking behaviors in a given region and their evolution.

BRIEF DESCRIPTION OF THE DRAWINGS

Reference will now be made to the accompanying drawings, which are not necessarily drawn to scale, and wherein.

DETAILED DESCRIPTION

Figure 1:
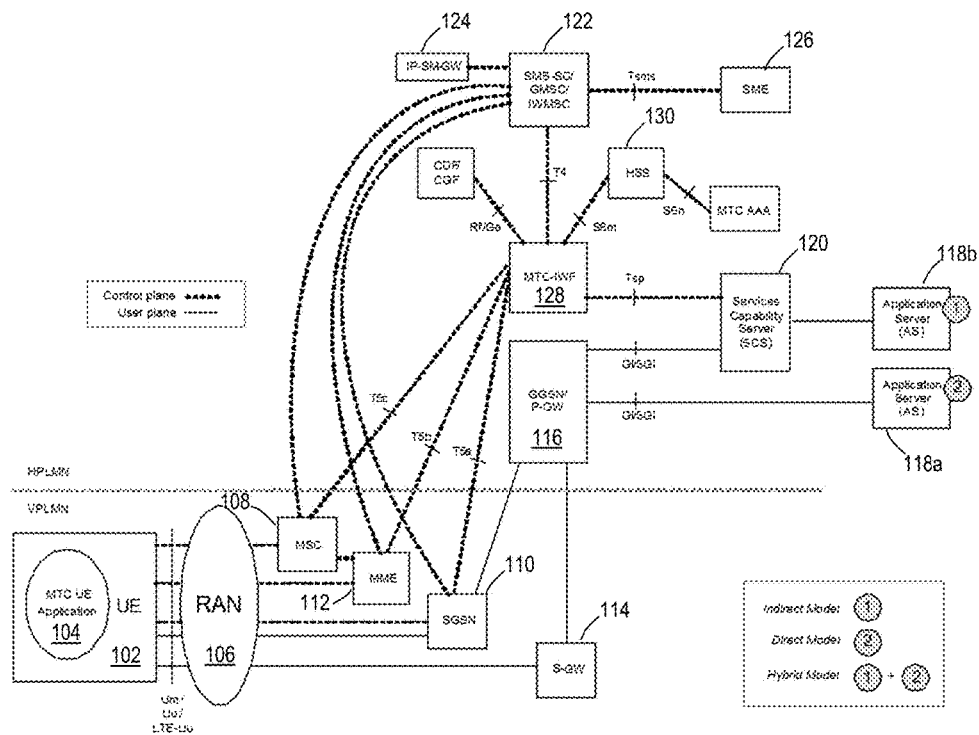
FIG. 1 depicts an illustrative embodiment of a mobile communication system.

The subject disclosure describes, among other things, illustrative embodiments for processing messages in a Public Land Mobile Network (PLMN). The mobile operator network can include a Converged IP Messaging (CPM) that supports delivery of messaging, including multimedia rich communications, applications and services. It is understood that such CPM message handling also includes Machine Type Communication (MTC). In some applications, Machine-to-Machine (M2M) messages are processed between a Mobile Station (MS), or User Equipment (UE), and a remote messaging application according to 3GPP IP Multimedia Subsystem (IMS) architectural framework.

M2M applications often include power saving techniques that allow UEs to remain in a low power mode for an extended period of time. Such low-power UEs can be reached through a process referred to as device triggering. Device Triggering is a means by which a Services Capability Serer (SCS) sends information to the UE via the 3GPP network to trigger the UE to perform application specific actions that include initiating communication with the SCS or an application server in the network.

The 3GPP standards defined MTC-IWF provides connectivity via existing core network elements to devices served by the radio access technologies, e.g., LTE, 3G, and/or 2G. In such applications, a Machine Type Communications Interworking Function (MTC-IWF) relays and/or translates signaling protocols used over a 3GPP standardized "Tsp" interface to invoke specific functionality in the PLMN. For those operators looking to retire their legacy access networks and re-allocate their radio frequency spectrum, further enhancements are necessary to allow the MTC-IWF allow LTE capable M2M devices to benefit from a CPM core. In particular, 3GPP Technical Specification, 3GPP TS 23.682, V13.0.0, incorporated herein by reference in its entirety, describes special "T5" reference points that are used to transfer device trigger requests, to report the success or failure of delivering a trigger request to a UE, and to provide congestion and/or load information of network elements, such as the SGSN (Serving General Packet Radio Service Support Node) and/or the MME (Mobility Management Entity). Namely, a "T5a" reference point is defined between the MTC-IWF and the SGSN, a "T5b" reference point is defined between the MTC-IWF and the MME, and a "T5c" reference point is defined between the MTC-IWF and the MSC (Mobile Switching Center).

Unfortunately, the "T5" represents a new diameter-based interface that would not be available on fielded equipment. To introduce such features would require a substantial re-investment by network operators. The techniques disclosed herein provide for an encapsulation of messages to/from the MTC-IWF that allow the MTC-IWF to communicate with legacy network functional elements, such as the MME, over existing interfaces, such as the SGsAP interface. Implementing such features avoids any need for the "T5a," "T5b," and/or "T5c" interface requirements. Other embodiments are described in the subject disclosure.

One or more aspects of the subject disclosure include a process that includes receiving, by a processing system including a processor, a machine-type communication message directed to a mobile station. The process further includes determining, by the processing system, a compatibility of the mobile station with a 3GPP IMS architecture. In response to determining that the mobile station is compatible with the 3GPP IMS architecture, a routing of the machine-type communication message is facilitated, by the processing system, to the mobile station via a network element of an IMS network core. In response to determining that the mobile station is not compatible with the 3GPP IMS architecture a routing of the machine-type communication message is facilitated, by the processing system, to a machine-type communication, interworking function associated with the mobile station, wherein the machine-type communication, interworking function facilitates delivery of the machine-type communication message to the mobile station via an SGs interface of a mobility management entity of an evolved packet core of a 3GPP long term evolution network, without using a T5 interface between the machine-type communication, interworking function and the mobility management entity.

One or more aspects of the subject disclosure include a device that includes a processing system including a processor and a memory that stores executable instructions. The instructions, when executed by the processing system, facilitate performance of operations, that include identifying a machine-type communication message directed to a mobile station, and determining a compatibility of the mobile station with a 3GPP IMS architecture. In response to determining that the mobile station is compatible with the 3GPP IMS architecture, a forwarding of the machine-type communication message to the mobile station is facilitated via a network element of an IMS network core. In response to determining that the mobile station is not compatible with the 3GPP IMS architecture a forwarding of the machine-type communication message is facilitated to a machine-type communication, interworking function associated with the mobile station. The machine-type communication, interworking function facilitates a directing of the machine-type communication message to the mobile station via an SGs interface of a mobility management entity of an evolved packet core of a 3GPP long term evolution network, without using a "T5" interface between the machine-type communication, interworking function and the mobility management entity One or more aspects of the subject disclosure include a machine-readable storage medium including executable instructions that, when executed by a processing system including a processor, facilitate performance of operations. The operations include identifying a machine-type communication message directed to a mobile station and determining a compatibility of the mobile station with a 3GPP IMS architecture. In response to determining that the mobile station is compatible with the 3GPP IMS architecture, a forwarding is facilitated of the machine-type communication message to the mobile station via a network element of an IMS network core. In response to determining that the mobile station is not compatible with the 3GPP IMS architecture a forwarding is facilitated of the machine-type communication message to a machine-type communication, interworking function associated with the mobile station, wherein the machine-type communication, interworking function facilitates a directing of the machine-type communication message to the mobile station via an SGs interface of a mobility management entity of an evolved packet core of a 3GPP long term evolution network.

FIG. 1 depicts an illustrative embodiment of an architectural reference model of a mobile communication system 100 that supports messaging services, including MTC. The system 100 includes one or more UEs 102 that can include one or more MTC-UE applications 104. The UEs 102 connecting to a 3GPP RAN (Radio Access Network) 103, such as a UTRAN, E-UTRAN, and/or GERAN, e.g., by one or more of Um, Uu and/or LTE-Uu interfaces. The system 100 includes core network elements, such as an MSC (Mobile Switching Center) 108, an SSGN (Serving GPRS Support Node) 110, an MME (Mobility Management Entity) 112 and/or an S-GW (Serving Gateway) 114. The system 100 further includes one or more of a GGSN (Gateway GPRS Support Node) and/or P-GW (Packet Gateway), illustrated collectively as a GGSN/P-GW 116. The GGSN/P-GW 116 is in communication with one or more of a first application server 118a directly, or a second application server 110b, by way of an SCS (Services Capability Server) 120.

The system includes messaging core elements, such as an SMS-SC (Short Message Service Center), a GMSC (Gateway Mobile Switching Center), and/or an SMS-IWMSC (Short Message Service Inter-Working Mobile Switching Center), illustrated collectively as an SMS-SC/GMSC/IWMSC 122. The SMS-SC/GMSC/IWMSC 122 is in communication with one or more of an IP-SM-GW (IP-Short-Message-Gateway) 124 and an SME (Short Messaging Entity) 126. Each of the application servers 118a, 118b (generally 118), the IP-SM-GW 124, and the SME 126 is placed outside the core network and serves as a transmission source of a trigger message to one or more of the UE 102. Each MT CUE 102 including a corresponding MTC application 104 can be associated with a corresponding MTC application hosted on one or more of the external application servers 118 that communicate with the UE 110 through the core network. Likewise, the SCS 120 and the SME 126 connect to the core network to communicate with the UE 110.

Furthermore, the core network includes an MTC-IWF 128 and an HSS (Home Subscriber Server) 130. In the example architecture, the GGSN/P-GW 116 is associated with a HPLMN (Home Public Land Mobile Network), whereas, the MME 112, the SGSN 110, the MSC 108 and the S-GW 114 are associated with a VPLMN (Visited Public Land Mobile Network). In the core network, each of the MTC-IWF 128 and the GGSN/P-GW 116 serves as a network node that receives a trigger message from a transmission source. Each of the MME 112, the SGSN 110, the MSC 108 and the S-GW 114 serves as a network element that forwards the trigger message to the UE 110, and the HSS 130 serves as a server that provides various information to the MTC-IWF 128. Typically, in a case of NAS (Non-Access Stratum) messaging, the MTC-IWF 128 receives a trigger message from the SCS 120 via a "Tsp" interface, and then forwards the trigger message to the MME 112 via a "T5b" interface. On the other hand, in a case of SMS message, the MTC-IWF 128 receives a trigger message from the SME 126 via a "T4" and "Tsms" interfaces, e.g., through SMSSC/GMSC/IWMSC 122, or from the SCS 120 via a "Tsp" interface, and then forwards the trigger message to the MME 112, the SGSN 110 and/or the MSC 108 via the "T5b," "T5a," and/or "T5c" interfaces. Thus, the trigger message can be routed by the MME 112, the SGSN 110 and/or the MSC 108 to the UE 110. The HSS 130 stores UE capabilities and/or serving node information, and notifies them to the MTC-IWF 128 via a "S6m" interface. The GGSN/P-GW 116 receives a trigger message from the SCS 120 or directly from the application server 118a via a "Gi/SGi" interface, and then forwards the trigger message to the SGSN 110 and/or the S-GW 114 through a user plane, so that the trigger message can be also routed to the UE 110.

Beneficially, the techniques disclosed herein allow for MTC communications, including trigger handling, to be processed within a PLMN, without requiring any "T5" interface, and without requiring that network devices, such as the MSC 108, the MME 112 and/or the SGSN 110 to accommodate any new interface, such as the "T5" interface.

Figure 2:
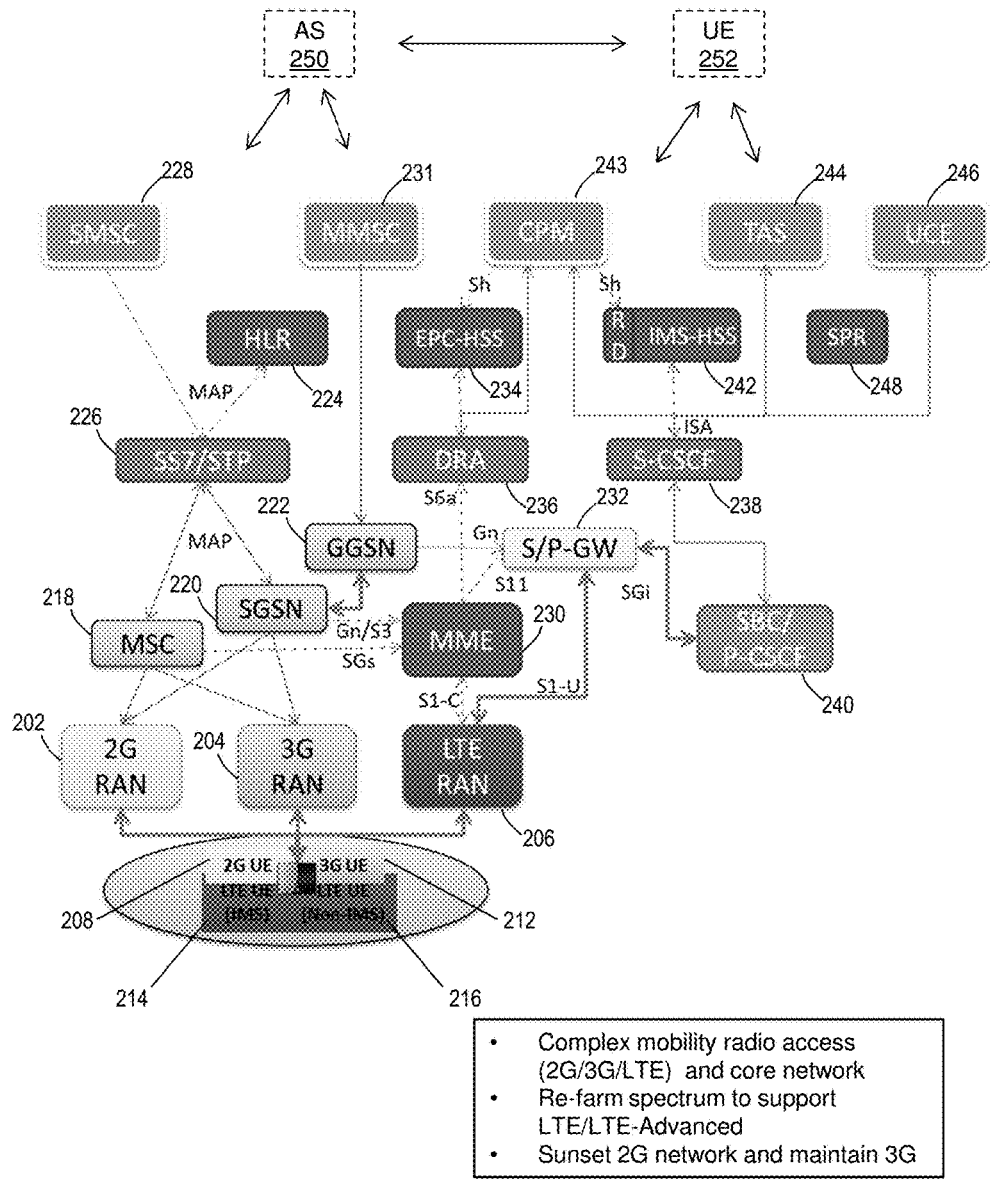
FIG. 2 depicts an illustrative embodiment of a portion of a mobile operator network.

FIG. 2 depicts an illustrative embodiment of a mobile communication system 200 that supports complex mobility radio access, e.g., 2G, 3G, and/or LTE, including machine type communications. The illustrative system 200 includes multiple radio access network technologies, including a 2G RAN 202, a 3G RAN 204 and an LTE RAN 206 supporting wireless mobile communications with one or more 2G compatible UE devices 208, 3G compatible UE devices 210 and/or LTE compatible UE devices. The LTE compatible UE devices can include one or more IMS capable UE devices 214 and/or non-IMS capable devices 216.

The RANs 202, 204, 206, in turn, are in communication with various mobility core network elements, including mobility messaging core elements. For example, the mobility core network can include GSM/UMTS network entities, such as an MSC 218, an SGSN 220, a GGSN (Gateway GPRS Support Node) 222, and a HLR (Home Location Register) 224 that support the 2G and/or 3G RANs 202, 204. A Short Message Service Center (SMSC) 228 is in communication with the MSC 218, the SGSN 220 and the HLR 224 via an SS7/STP (Signaling System No. 7/Signal Transfer Point) 226, according to a MAP (Mobile Application Part), a protocol that provides an application layer for various nodes in mobile core networks, such as GSM and UMTS mobile core networks and GPRS core networks to communicate with each other in order to provide services to mobile users. The GGSN 222 is in communication with an MMSC (Multimedia Messaging Service Center) 231, and in further communication with the SGSN 220.

Likewise, one or more of the RANs 202, 204, 206 are in communication with network elements of a 3GPP LTE Evolved Packet Core (EPC). The EPC can include an MME 230, an S-GW, a P-GW, and/or a combined S/P-GW 232. The MME 230 is in communication with the LTE RAN 206 via an "S1-C" control plan interface, with the S/P-GW 232 via an "S11" control plan interface, and with other network elements, such as an EPC-HSS (Home Subscriber Server) 234 by way of an a Diameter Routing Agent (DRA) 236 via an S6a control plane interface. The DRA 236 provides real-time routing capabilities to ensure that messages are routed among the appropriate elements in a network. The MME 230 supports control plane connections with the SGSN 220 via a "Gn/S3" interface and with the MSC via an "SGs" interface, and the LTE RAN 206 is in communication with the S/P-GW 232 via an "S1-U" user plane interface.

The system 200 also includes IMS network elements, such as an S-CSCF (Serving-Call Session Control Function) 238, a P-CSCF (Proxy CSCF), and in at least some instances, a SBC (Session Border Controller). The illustrative system 200 includes a combined SBC/P-CSCF 240. The SBC/P-CSCF 240 is in communication with the SCSF 238 and with the SBC/P-CSCF 240 via an "SGi" interface. The IMS network elements include an IMS-HSS 242 having a control plane interface with the S-CSCF 238. A CPM entity 243 includes functionality that facilitates converged IP messaging. The example CPM entity 243 includes "Sh" control plane interfaces with each of the EPC-HSS 234 and the IMS-HSS 242. The CPM 243 also includes interfaces, e.g., user plane interfaces, with one or more of the DRA 236, the S-CSCF 238, a TAS (Telephony Application Server) 244 and a User Capability Exchange (UCE) server 246. The UCE server 246 provides insight into IP capable devices. For example, an IP capable device can be equipped with a resident UCE client that exchanges user capability information with the UCE server 246. In at least some embodiments, the UCE server 246 is an IMS-centric application server that keeps track of UCE service personalities, e.g., associated with SIM changes in the IP capable devices.

CPM generally supports one-to-one, one-to-many personal communications, and also communication with applications, such as M2M, as disclosed in 3GPP-TS-23824-a00, incorporated herein by reference in its entirety. A CPM Message can contain one or more discrete media types, e.g., text, images, audio-clips, and/or video-clips. Application servers support the functionality of a CPM participating function and/or a CPM controlling function, e.g., as defined in Open Mobile Alliance, "Converged IP Messaging Requirements," OMA-RD-CPM-V1_0-20091218, incorporated herein by reference in its entirety.

The illustrative system 200 also includes an SPR (Subscriber Profile Repository) 248 for keeping subscriber policies and profiles for QoS (Quality of Service) management. The SPR 248 and the EPC-HSS 234 are databases keeping subscribers' information with different roles in a 3GPP LTE architecture. Namely, the HSS 234 supports authentication of LTE subscribers, e.g., according to IMSI (International Mobile Subscriber Identity) as a primary key for SAE-HSS, in which SAE (System Architecture Evolution—a core network architecture of a 3GPP LTE wireless communication standard) and IMPU (IMS Public ID)+IMPI (IMS Private ID) for IMS VoLTE authentication.

It is understood that messages can be exchanged between one or more of the UEs 208, 212, 214, 216 and one or more of an Application Server (AS) 250 and/or a UE 252. Such message exchanges utilize one or more features of the system 200. For example, MTC messages can be exchanged using one or more of the SMSC 228, the MMSC 231, the CPM 243 and/or the TAS 244. In some embodiments, an MTC message can be initiated in response to activity of an AS 250. For example, an AS 250 of a public utility company might initiate an M2M SMS directed to one or more UEs, such as residential utility meters, to initiate a meter reading process. Alternatively or in addition, a message form a mobile application of a UE 252 of a field service engineer/technician might initiate a SMS directed to one or more fielded equipment items by way of one or more of the UEs 208, 212, 214, 216. Such messages might request information from fielded equipment, such as an operational status. Alternatively or in addition, such messages might provide information to fielded equipment, such as updated operational parameters, updated software and the like.

Figure 3:
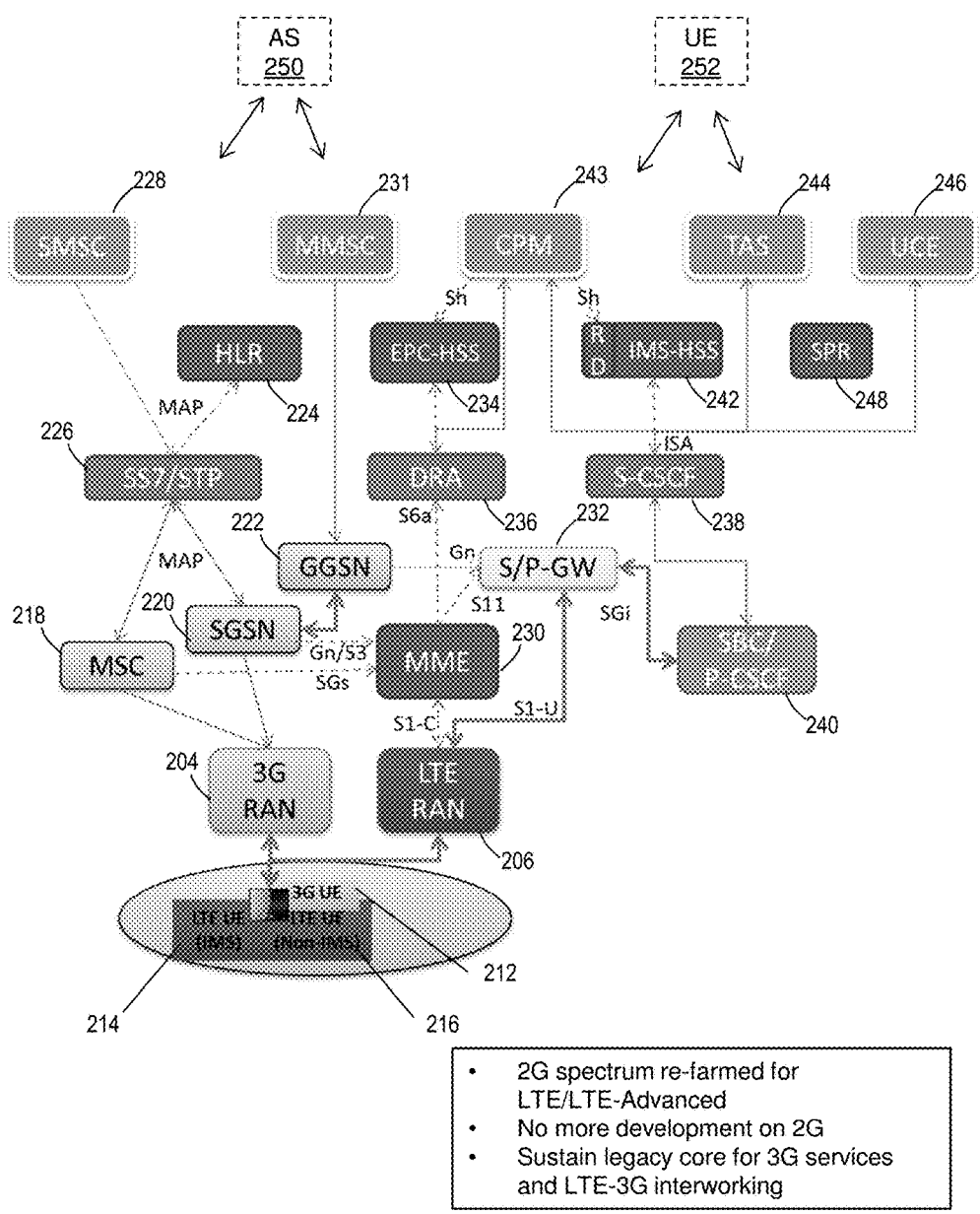
FIG. 3 depicts another illustrative embodiment of a portion of a mobile operator network.

FIG. 3 depicts an illustrative embodiment of a mobile communication system 300 that includes the system 200 (FIG. 2) in which a 2G capability has been eliminated. Namely, the 2G RAN 202 (FIG. 2) has been removed or otherwise decommissioned. Such a modification allows the mobile network operator to re-allocate any 2G radio frequency spectrum to other uses, such as LTE and/or LTE-A applications. The system 300 retains the 3G, LTE and IMS features and capabilities disclosed above in relation to FIG. 2, including legacy core network elements for 3G services and LTE-3G interworking. It is understood that 2G UE 208 (FIG. 2) are no longer supported by the system 300.

Figure 4:
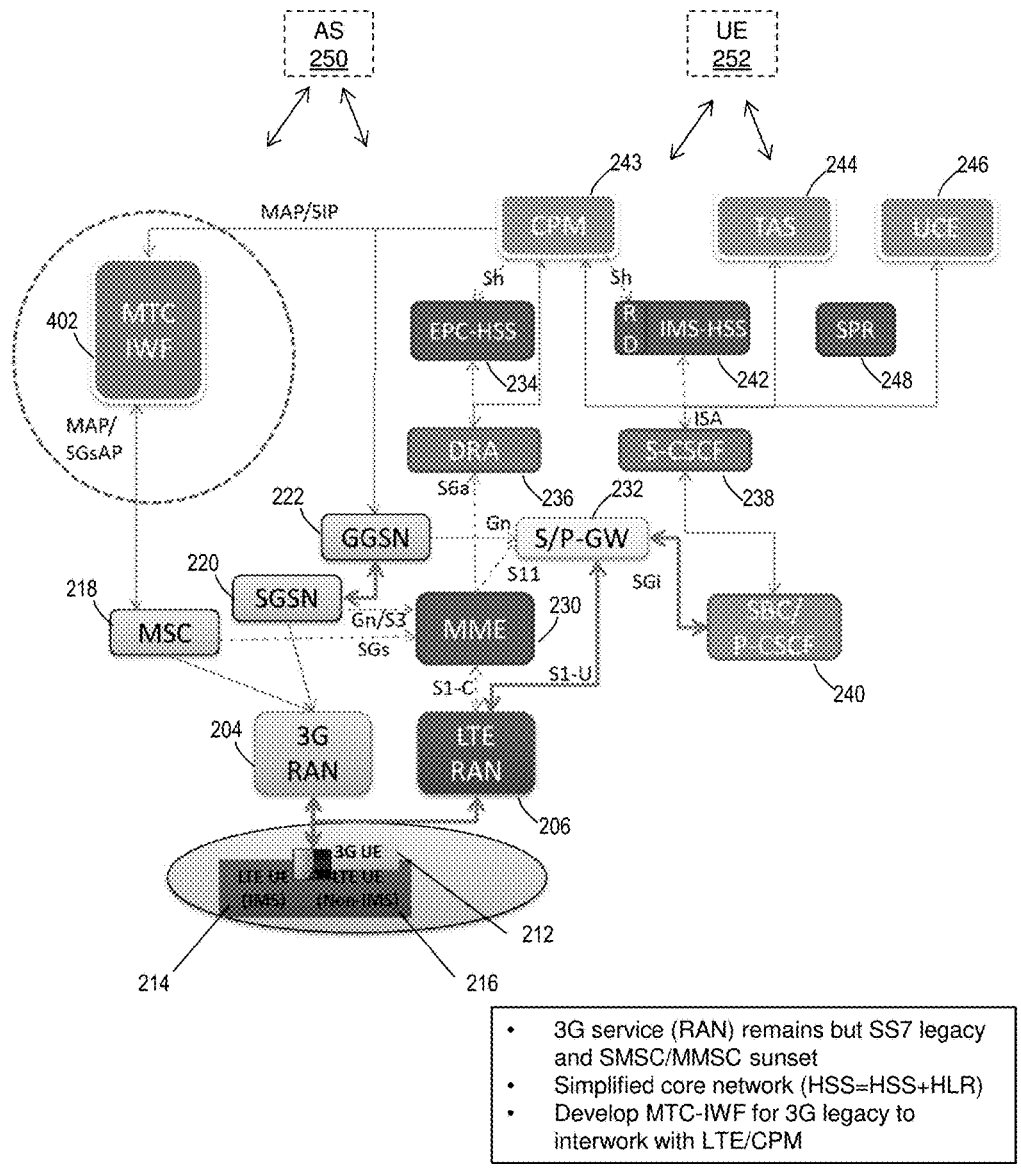
FIG. 4 depicts another illustrative embodiment of a portion of a mobile operator network.

FIG. 4 depicts an illustrative embodiment of another mobile communication system 400 that includes the system 200 (FIG. 2) in which the 2G capability has been eliminated, along with the SS7 legacy signaling, the SMSC 228 and the MMSC 231 (FIG. 2). Namely, the 2G RAN 202 (FIG. 2) has been removed, as in FIG. 3, along with the SS7/STP 226, the HLR 224, the SMSC 228 and the MMSC 231. The system 400 retains the 3G, LTE and IMS features and capabilities disclosed above in relation to FIGS. 2 and 3.

The system 400 includes an MTC-IWF 402 to bridge certain messaging functionality as disclosed herein. The CPM 243 is in communication with the GGSN 222 and the MTC-IWF 402. The MTC-IWF 402, in turn, is in communication with the MSC 218 via a MAP/SGsAP (SGs Application Part) interface. Inbound, Machine Terminated MTC (MT-MTC) are routed or otherwise forwarded to one or more of the UE 212, 214, 216 via the MTC-IWF 402 and the MSC 218. Likewise, outbound, Machine Originated MTC (MO-MTC) from the UE 212, 214, 216 via the MSC 218 and the MTC-IWF 402.

It should be understood in various architectural scenarios, a single CPM 243 is in communication with multiple MTC-IWFs 402, serving multiple 3G RANs 204 through multiple MSCs 218, e.g., serving multiple different geographic region. It is also understood that in at least some applications, one or more of the network elements, including the MTC-IWF 402, the MSC 218, the SGSN 220 and/or the GGSN 222 can be arranged in redundant pools. Such pooling arrangement allows a particular network element of the pooled network elements to be selected according to various factors. Selection factors can include, without limitation, availability, congestion, operational status, maintenance status, memory and/or processing capacity, and the like.

In the illustrative embodiment, the MTC-IWF 402 receives and forwards MAP messages, e.g., according to the MTC-IWF described in 3GPP standards. The CPM 243, however, is in communication with the MTC-IWF 402 via a SIP (Session Initiation Protocol) interface. The different protocol/interfaces between the CPM 243 and the MTC-IWF 402 can be resolved by encapsulating SIP compliant messages from the CPM 243 within a MAP protocol at or prior to a corresponding interface of the MTC-IWF 402. This allows the CPM 243 to communication with the MTC-IWF 402 as if it were communicating with the retired SS7STP 226. Likewise, the MTC-IWF 402 is in communication with the MSC 218 via an SGsAP interface, which allows the MSC 218 to also communicate with the MTC-IWF 402 as if it were still communicating with the retired SS7/STP 226. Accordingly, the different protocol/interfaces between the MTC-IWF 402 and the MSC 218 are resolved by encapsulating MAP-compliant messages, from the MTC-IWF 402 within a SGsAP protocol at or prior to a corresponding interface of the MSC 218. This second encapsulation can include a double encapsulation by which MAP messages that encapsulate SIP messages are further encapsulated into SGsAP compliant messages.

Figure 5:
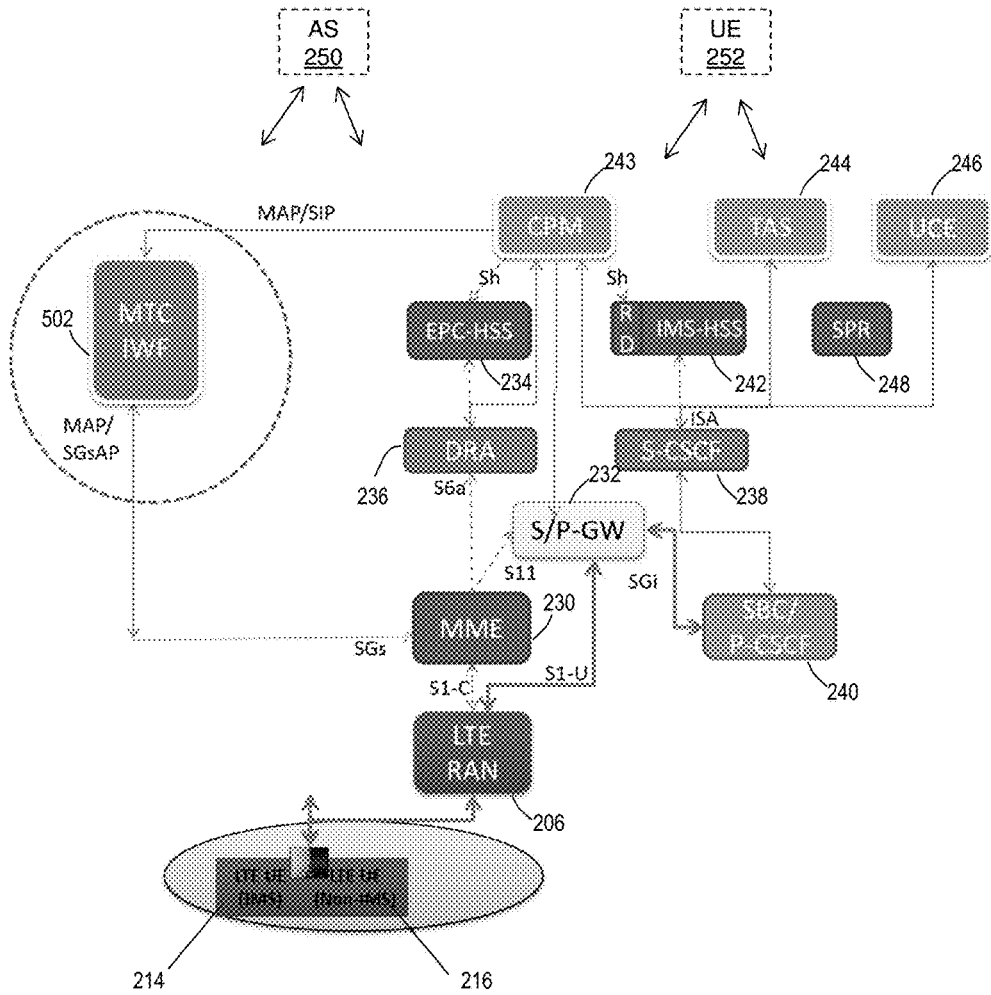
FIG. 5 depicts another illustrative embodiment of a portion of a mobile operator network.

FIG. 5 depicts an illustrative embodiment of yet another mobile communication system 500 that includes the system 200 (FIG. 2) in which the 2G capability has been eliminated, along with the SS7 legacy signaling, the SMSC 228 and the MMSC 231 (FIG. 2). Namely, the 2G RAN 202 (FIG. 2) has been removed, as in FIG. 3, along with the SS7/STP 226, the HLR 224, the SMSC 228 and the MMSC 231, as in FIG. 4. Namely, the 2G RAN 202 (FIG. 2) has been removed, along with the SS7/STP 226, the HLR 224, the SMSC 228 and the MMSC 231 of FIGS. 2 and 3. The system 500 further includes the system 400 (FIG. 4) in which the 3G capability has also been eliminated. Namely, the 3G RAN 204 (FIGS. 2-4) has been removed along with the MSC 218, the SGSN 220 and the GGSN 222. It is understood that 2G UE 208 (FIGS. 2) and 3G UE 212 (FIGS. 2-4) are no longer supported by the system 300.

The system 500 includes an MTC-IWF 502. The CPM 243 is in communication with the MTC-IWF 502 via a SIP interface. The MTC-IWF 502 is in further communication with the MME 230 via an SGsAP interface. Inbound, MT-MTC are routed or otherwise forwarded to one or more of the UE 214, 216 over the LTE RAN 206 via the MTC-IWF 402 and the MME 218.

In the illustrative embodiment, the MTC-IWF 502 receives and forwards MAP messages, e.g., according to the MTC-IWF described in 3GPP standards. The CPM 243, however, is in communication with the MTC-IWF 502 via a SIP (Session Initiation Protocol) interface. The different protocol/interfaces between the CPM 243 and the MTC-IWF 502 can be resolved by encapsulating SIP compliant messages from the CPM 243 within a MAP protocol at or prior to a corresponding interface of the MTC-IWF 502. Likewise, the MTC-IWF 502 is in communication with the MSC 218 via an SGsAP interface. The different protocol/interfaces between the MTC-IWF 502 and the MSC 218 can be resolved by encapsulating MAP compliant messages, from the MTC-IWF 502 within a SGsAP protocol at or prior to a corresponding interface of the MSC 218. This second encapsulation can include a double encapsulation by which MAP messages that encapsulate SIP messages are further encapsulated into SGsAP compliant messages.

In a traditional 3G/2G wireless access network, the device gets a mobile terminated (MT) SMS from the SMSC through the MSC via the RNC/NodeB (3G) and BSC/BTS (2G). In an LTE network, the SMS to a non-IMS capable UE gets delivered from the SMSC to MSC and through the MME/eNB to the UE. This happens via the SGs interface that is established between the MME and MSC. Mobile network operators are in the midst of upgrading their messaging core infrastructure to an all-IP converged messaging core that supports rich communication applications taking into account various factors such as groups, contacts, presence, social communication/networking behaviors etc.

An LTE device that is IMS capable can receive SMS directly from the CPM via SBC/P-CSCF in the IMS Core and SGi interface into the LTE network (PGW-SGW-eNB). Similarly, the same device that is IMS capable but camped in 3G (outside LTE coverage) could obtain the SMS via the IMS network.

A large number of M2M capable wireless devices deployed across various industry verticals today are non-IMS capable and they are still served by the legacy 3G/2G wireless technologies. However, as operators cap their investments in 2G and 3G wireless technologies (both access and core networks) and retire these legacy technologies gradually, the millions of such non-IP/non-IMS capable devices continually need a means of establishing communication with the evolving messaging core.

These millions of non-IMS M2M devices (supporting LTE/3G/2G) may gradually get converted to support IMS clients over several years or be replaced with new LTE M2M devices as the chipset costs scale down significantly. Since support for embedded IMS clients in the devices and incremental processing impacts device cost, battery power efficiency due to always on connectivity and background soft-SIP applications, such an all-IP convergence may take a while.

The techniques disclosed herein ensure that there is service continuity for such non-IMS capable LTE devices using an evolving CPM core. The various network enhancements disclosed herein accomplish this by implementing features into the messaging infrastructure along with an interworking function that bridges the MAP protocol with other protocols, e.g., SIP and SGsAP.

In case of MT-SMS delivery for M2M device or a group of devices, when the SMS is received by the CPM, the CPM queries a Subscription/Provisioned services Repository (SPR), e.g., using an LDAP protocol to identify whether the M2M device is IMS capable or not. In some embodiments, a database of service profiled includes a Master Integrated Network Directory the (MIND). If the device is not IMS capable, the CPM can launch a new query towards the EPC-HSS using an "Sh" interface so that it can extract the non-IMS M2M UE/UEs location/locations and their corresponding serving MME/MMEs, understanding that locations of the MMEs might span multiple regions. For MO-SMS (MS Originated SMS), the MME can send the SMS to a pre-configured MTC-IWF pair for subsequent processing by the CPM for appropriate delivery to the far end.

Once the CPM extracts the tracking area and MME information, it determines a way to deliver that SMS message to the MME. Since the example CPM messaging core doesn't have a direct signaling interface with the MME and interworks with it only via an interworking function MTC-IWF, the CPM needs to determine which MTC-IWF serves that specific MME within a given MME pool region. This can be obtained via a standardized DNS query and resolution mechanism that could be implemented within the CPM, or at least in part facilitated by the CPM. The MME interfaces with the MTC-IWF over the 3GPP standards defined SGs SCTP interface. The MTC-IWF can be implemented as a virtualized software application running on a commercial off-the-shelf hardware and could reside as a stand-alone entity in the data center or it could be collapsed into another network entity, such as the CPM core.

Once the MTC-IWF serving a specific MME within a given MME pool region is selected, the CPM delivers the IMS based SMS using the SIP protocol, e.g., using, so-called, "wrapper functions" to implement the encapsulations. In at least some applications, the wrapper functions are implemented within the MTC-IWF. Consequently, the MME "sees" the SMS, including processing by the MTC-IWF, as an SGsAP application layer message, according to 3GPP standardized implementations. Thus, all non-IMS LTE capable M2M devices in the absence of 3G/2G infrastructure can continue to receive their SMS services using the existing SGs LTE interface.

Such an intelligent double-layer wrapping mechanism implemented within the MTC-IWF and CPM interface towards HSS can simplify the SMS delivery to millions of non-IMS capable LTE M2M devices.

Figure 6:
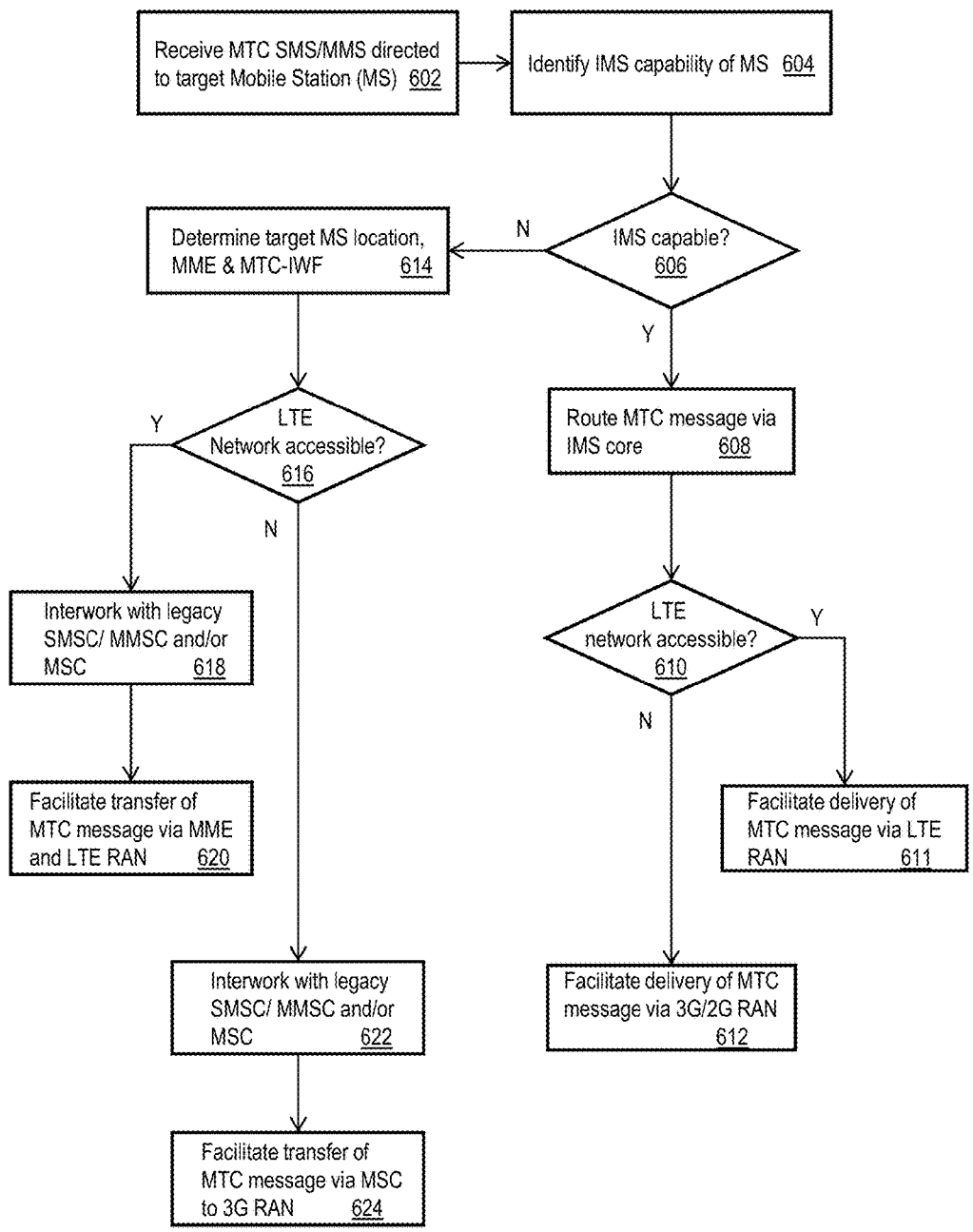
FIG. 6 depicts an illustrative embodiment of a process used in portions of the systems described in FIGS. 1-5.

FIG. 6 depicts an illustrative embodiment of a process 600 used in portions of the systems described in FIGS. 1-5. An MTC message is received at 602. The MTC message can include any form of messaging, such as an SMS message, an MMS message or any combination thereof. In the illustrative process, the MTC message is directed towards one or more mobile stations or UEs. In some embodiments, the MTC message is sent from a machine according to an M2M scenario. For example, the MTC message is responsive to activity of an application Server (AS).

Alternatively or in addition, the MTC message can be originated from equipment of a user in response to actions of a user, e.g., in response to activity of a mobile application of a mobile user. The activity of a mobile application can be initiated automatically, in response to actions of a user, or any combination thereof.

Capabilities, equipment type and or features of the equipment or UE of a message recipient is identified at 604. In some embodiments, this can be accomplished by identifying a message recipient based on the message and/or routing information related to the message. For example, the message can include an originator address and/or a destination address, as in a traditional SMS packet format.

A determination is made as to whether the equipment of the message recipient is IMS capable at 606. Such a determination can be made using an IMS-HSS 242. The IMS-HSS is a master user database that supports IMS network entities that handle calls. It can include subscription-related information, e.g., subscriber profiles, and in at least some instances, perform authentication and authorization of a user. In at least some instances, the IMS-HSS 242 can provide information about a location of equipment of a subscriber. In some regards, it is similar to a GSM HLR 224 and authentication center. The IMS-HSS 242 can include an indication of a type of equipment of a subscriber. For example, the indication can include an IMSI. Such indicators can be used to identify equipment capabilities, e.g., by way of the HSS records, or in association with other records.

To the extent that the equipment of the message recipient is determined to be IMS compatible, distribution of the message is facilitated towards the equipment of the message recipient via an IMS core portion of a mobile operator network at 608. Having established a destination address, a subscriber and/or capabilities of the subscriber equipment, or UE, a determination is made as to whether the equipment of the message recipient is LTE network accessible at 608.

It is understood that some UE are capable of operating on more than one RAN types. For example, a UE can be capable of operating in an LTE RAN, while having a capability to also operate on a 3G and/or 2G RAN, e.g., in fall-back scenario, if LTE is not available, or unable to meet a required QoS. One or more of the core network elements, e.g., the HSS, the MME and/or the S/P-GW, and/or the CPM can determine whether the message recipient UE is accessible by way of LTE at 610.

To the extent that the equipment of the message recipient is LTE network accessible, delivery of the message is facilitated via an LTE RAN at 610. To the extent that the equipment of the message recipient is not LTE network accessible, delivery of the message is facilitated via an 3G/2G RAN at 612.

Referring again to step 606, to the extent that the equipment of the message recipient is not IMS compatible, a location of the equipment of the message recipient is identified at 614. The HLR 224 provides a central database that contains details of each mobile phone subscriber that is authorized to use the GSM core network. The HLR 224 stores details of SIM cards issued by a mobile phone operator. Each SIM has a unique identifier called an IMSI which can serve as a key to each HLR record. In some embodiments, the HLR records that can indicate capabilities of the UE, such as whether the UE is IMS compatible. In some embodiments, the HLR records include a location of the UE. Considering that the UE can be mobile, the location may be within a home PLMN, a visiting PLMN, and/or subject to changes when a UE is mobile. In at least some embodiments the HLR can be used to identify UE location to a particular cell, and/or a tracking area.

A determination is made as to whether the equipment of the message recipient is LTE network accessible at 616. To the extent that the equipment of the message recipient is determined at 616 not to be LTE network accessible, processing of a transfer of the message to the equipment of the message recipient includes interworking with a legacy SMSC, MMSC and/or MSC at 622. A transfer of the message to the equipment of the message recipient is facilitated by way of the MSC and a 3G RAN at 624.

To the extent that the equipment of the message recipient is determined at 616 to be LTE network accessible, processing of a transfer of the message to the equipment of the message recipient includes interworking with a legacy SMSC, MMSC and/or MSC at 618. A transfer of the message to the equipment of the message recipient is facilitated by way of an LTE RAN at 620.

The interworking features, e.g., at 618 and/or 622 can include functionality of the MTC-IWF 402, 502. To facilitate interactions with the MTC-IWF, one or more encapsulations can be implemented between standard 3GPP LTE interfaces, without requiring any of the specialized, e.g., "T5" interfaces related to the MTC-IWF. For example, encapsulation of a message from the CPM can include receiving a SIP message from the CPM, encapsulating the SIP message into a MAP format and forwarding the encapsulated MAP message to the MTC-IWF. The encapsulation can be implemented in any suitable location, such as at the CPM 243, at the MTC-IWF 402, 502 and/or in an intermediate network element positioned between network interfaces of the CPM 243 and the MTC-IWF 402, 502.

Similarly, encapsulation of a message from the MTC-IWF 402, 502 towards the MSC 218 can include receiving a MAP message from the MTC-IWF, and encapsulating the MAP message into an SGsAP format and forwarding the encapsulated MAP message to the MSC. The encapsulation can be implemented in any suitable location, such as at the MTC-IWF 402, 502, at the MSC 218 and/or in an intermediate network element positioned between network interfaces of the MTC-IWF 402, 502 and the MSC 218.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It is understood that multiple forms of MTC services can be offered to UE devices over mobile technologies such as those described above. Additionally, MTC services can be offered to UE devices by way of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The SMS delivery mechanism for non-IMS capable M2M devices disclosed herein provides the CPM with an intelligent, simplified, coordinated and robust network design critical to delivering efficient and rich messaging content for millions of connected devices. Such an architecture provide numerous advantages, such as a unified, all-IP and rich messaging core network architecture design and implementation. Other advantages include an enhanced MTC-IWF that can provide rich messaging services from various application servers to the M2M capable devices. The solutions can use an existing DNS infrastructure to query the MTC-IWF that serves a given MME region. Likewise, the solutions can use the existing SGs interface design on the MME for non-IMS capable delivery.

The techniques disclosed herein support an intelligent network management systems and analytics for network resources related data collection, reporting and alerting in a closed-loop manner, while offering a significant capital expenditure savings due to simplification of the network design, e.g., eliminating legacy devices, such as the SMSC/MMSCs.

The techniques disclosed herein also support a significant savings in operational expenses as there is no need to maintain legacy access, STP and messaging core network infrastructure. Differentiated services are can be offered and supported for non-IMS/IMS capable LTE M2M customers. Moreover, these advantages maintain a "best-in-class" mobility access, messaging core network and services design, which should minimize subscriber churn and leverage deployed base for continued M2M revenue generation.

A robust MTC-IWF dual-layer wrapping functionality and core network selection/interworking mechanism via closed-loop monitoring and intelligence within the CPM nodes to enhance the overall messaging core network design for M2M SMS services over LTE networks. This results in efficient management of scarce radio frequency spectrum and network resources, while preventing potential network and service outages to deliver the world's best-in-class M2M mobile connectivity experience across industry verticals realizing the industry objectives of Industrial Internet/Internet Of Things.

Figure 7:
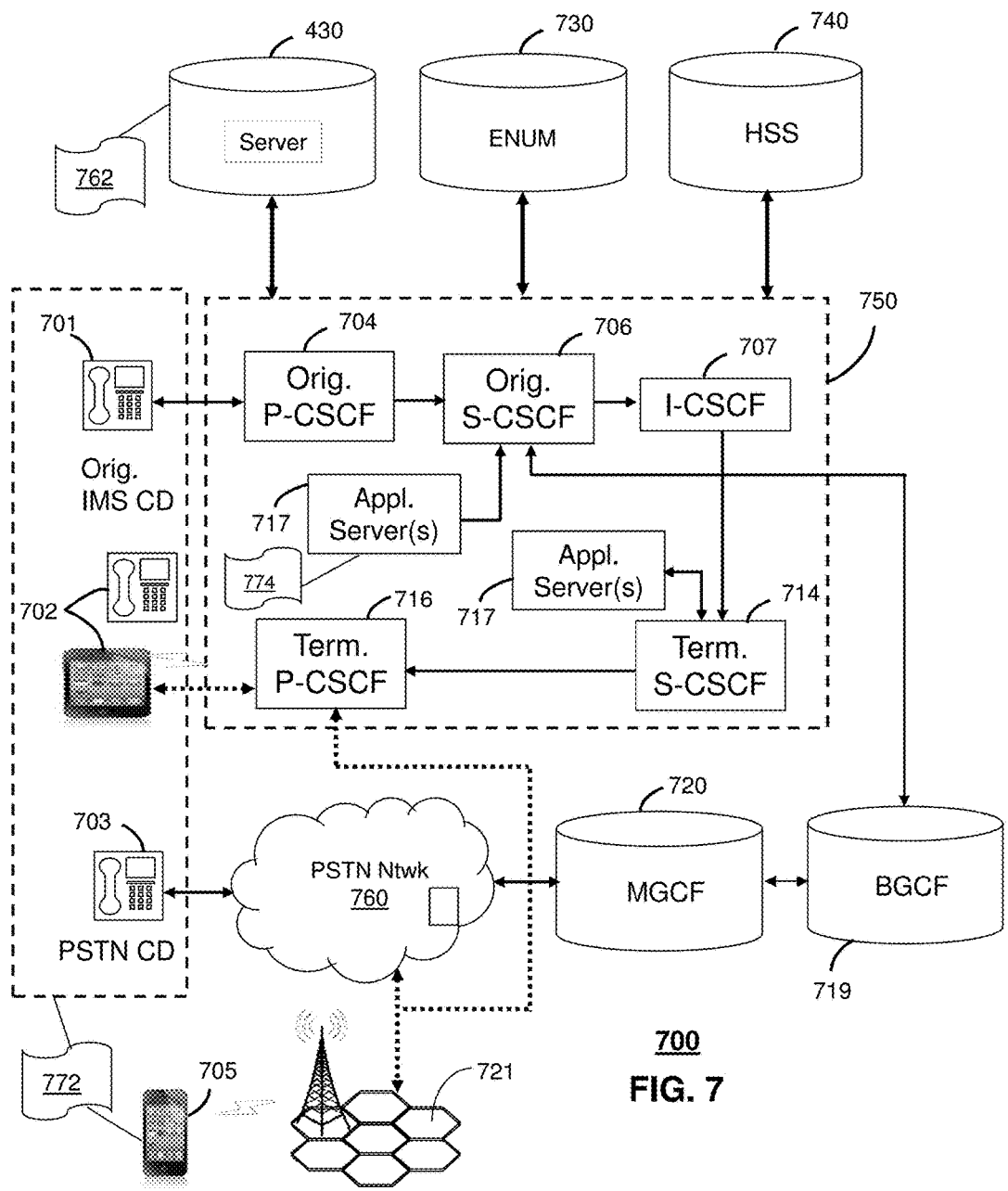
FIG. 7 depicts an illustrative embodiment of a communication system that provides media services in cooperation with the systems of FIGS. 1-5 and the process of FIG. 6.

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with systems 100, 200, 300, 400, 500 of FIGS. 1-4 and/or 5. The system 700 is configured to identify an MTC message directed to a mobile communication device 705 and determine a compatibility of the mobile communication device with a 3GPP IMS architecture. In response to determining that the mobile communication device 705 is compatible with the 3GPP IMS architecture, a forwarding is facilitated of the MTC message to the mobile communication device 705 via a network element of an IMS network core 750. In response to determining that the mobile station is not compatible with the 3GPP IMS architecture a forwarding is facilitated of the MTC message to an MTC-IWF associated with the mobile communication device 705, wherein the MTC-IWF facilitates a directing of the machine-type communication message to the mobile communication device 705 via an SGs interface of a mobility management entity of an evolved packet core of a 3GPP LTE network.

The communication system 700 can include a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF

706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 400 of FIG. 4.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 700 for purposes similar to those described above. For example, a server 430 can perform an MTC-IWF function 762 and thereby provide message handling services to support messaging to/from the CDs 701, 702, 703 and 705 of FIG. 7 similar to the functions described for the MTC-IWF 402, 502 of FIGS. 4-5 in accordance with process 600 of FIG. 6. The CDs 701, 702, 703 and 705, which can be adapted with software to perform messaging functions, including MTC functions 772 to utilize the services of the server 430, in accordance with process 600 of FIG. 6. The server 430 can be an integral part of the application server(s) 717 performing messaging functions, including MTC functions 774, which can be substantially similar to function 772 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3GPP. It is further noted that some or all embodiments of the subject disclosure may in whole or in part modify, supplement, or otherwise supersede final or proposed standards published and promulgated by 3GPP.

Figure 8:
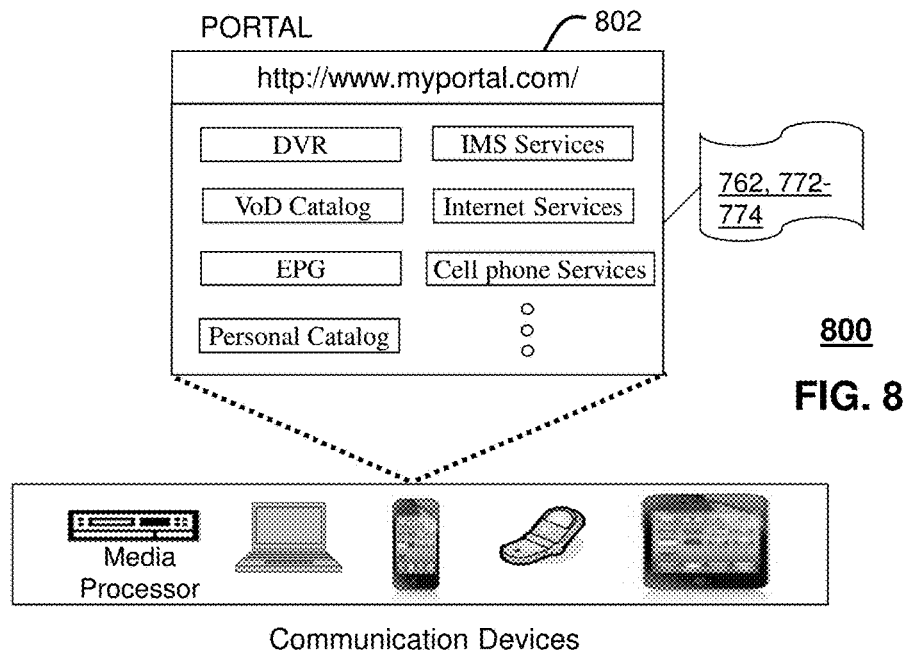
FIG. 8 depicts an illustrative embodiment of a web portal for interacting with the communication systems of FIGS. 1-5 and 7.

FIG. 8 depicts an illustrative embodiment of a web portal 802 of a communication system 800. Communication system 800 can be overlaid or operably coupled with systems 100, 200, 300, 400, 500 of FIGS. 1-4 and/or 5 and/or communication system 700 as another representative embodiment of systems 100, 200, 300, 400, 500 of FIGS. 1-4 and/or 5 and/or communication system 700. The web portal 802 can be used for managing services of systems 100, 200, 300, 400, 500 of FIGS. 1-4 and/or 5 and communication system 700. A web page of the web portal 802 can be accessed by a Uniform Resource Locator (URL) with an Internet browser using an Internet-capable communication device such as those described in FIGS. 1-5 and/or FIG. 7. The web portal 802 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 802 can also be used for provisioning IMS services described earlier, provisioning Internet services, provisioning cellular phone services, and so on.

The web portal 802 can further be utilized to manage and provision software applications 762, 772-774 to adapt these applications as may be desired by subscribers and/or service providers of systems 100, 200, 300, 400, 500 of FIGS. 1-4 and/or 5 and communication system 700. For instance, users of the messaging services facilitated by the MTC-IWF 402, 503, or server 430 can log into their on-line accounts and provision the MTC-IWF 402, 503, server 430 and/or UEs 208, 212, 214, 216 with a feature that a user may want to program such as message types, message formats, authorization information, security, contact schedules, equipment locations, types and so forth to enable it to communication with devices described in FIGS. 1-7, and so on. Service providers can log onto an administrator account to provision, monitor and/or maintain the systems 100, 200, 300, 400, 500 of FIGS. 1-4 and/or 5 or server 430.

Figure 9:
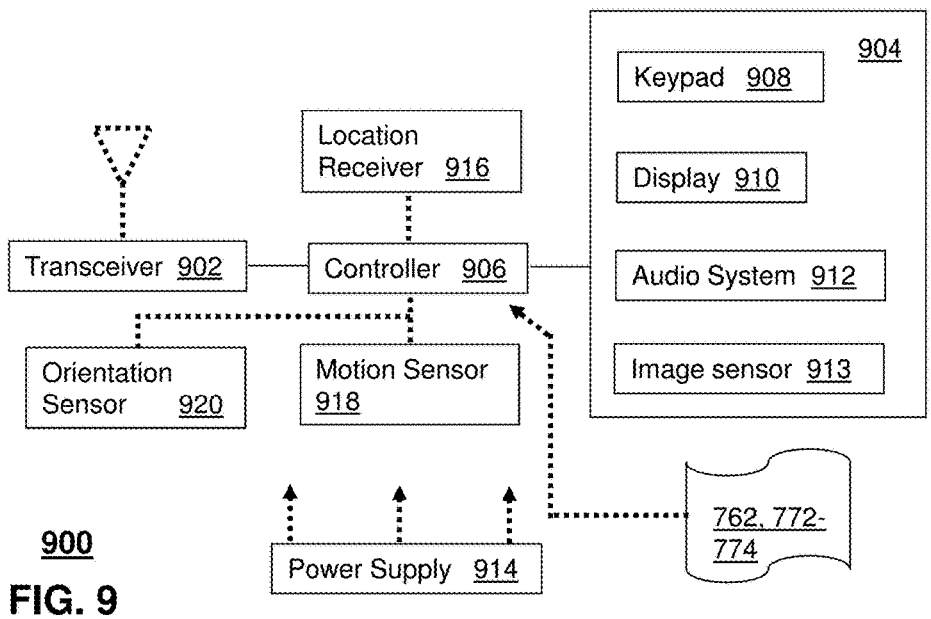
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-5 and/or FIG. 7 and can be configured to perform portions of process 600 of FIG. 6.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900.

In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of one or more of the devices of FIGS. 1-4 and/or 5, the media processor 406, the media devices 408, or the portable communication devices 208, 212, 214, 216 of FIGS. 2-5, as well as the IMS CDs 701-702 and PSTN CDs 703-705 of FIG. 7. It will be appreciated that the communication device 900 can also represent other devices that can operate in the systems of FIGS. 1-4 and/or 5, communication systems 400-700 of FIGS. 4-7 such as IoT devices, utility meters, transportation vehicles, shipping containers, gaming consoles, media players and the like. In addition, the controller 906 can be adapted in various embodiments to perform the functions 762, 772-774, respectively.

Upon reviewing the aforementioned embodiments, it would be evident to an artisan with ordinary skill in the art that said embodiments can be modified, reduced, or enhanced without departing from the scope of the claims described below. For example, in some applications, a message is directed to more than one equipment items, e.g., by way of one or more UEs 208, 212, 214, 216. When directed to multiple UEs, it is envisioned that they can be served by the same RAN, and/or different RANs, e.g., in different geographic regions.

In some embodiments, messages directed to multiple UEs include a broadcast messaging service. In at least some multi-destination messaging applications, a broadcast message is associated with one or more geographical regions. Such regions can be identified by one or more of geographic parameters, e.g., a range, area, elevation and/or shape. Alternatively or in addition, such regions can be identified by geo-political boundaries, such as countries, states, counties, cities, towns, etc. Selection of one or more network functional elements, such as the RANS, the MTC-IWF and so on can be based upon the geographic regions.

It should be understood that one or more of the devices disclosed herein can be implemented as hardware, software, firmware or any combination thereof. One or more of the network functional elements disclosed herein, such as the MSC 218, the SGSN 220, the GGSN 222, the MME 230, the S/P-GW 232, the SBC/P-CSCF 240, the S-CSCF 238, the EPC-HSS 234 the HLR 224 and the IMS-HSS can be implemented as a virtualized network function. In at least some applications, virtualized network functions are implemented on one or more virtual machines. One or more of the network functional elements can be controlled, configured, allocated, and/or associated with other such network functional elements according to Software Defined Networking (SDN). The virtual functions and/or virtual machines can be provided in redundant pools and allocated, as required. Without limitation, such allocations can be provided on a per message basis, a per session basis, a per client basis, and so on. Other embodiments can be used in the subject disclosure.

It should also be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
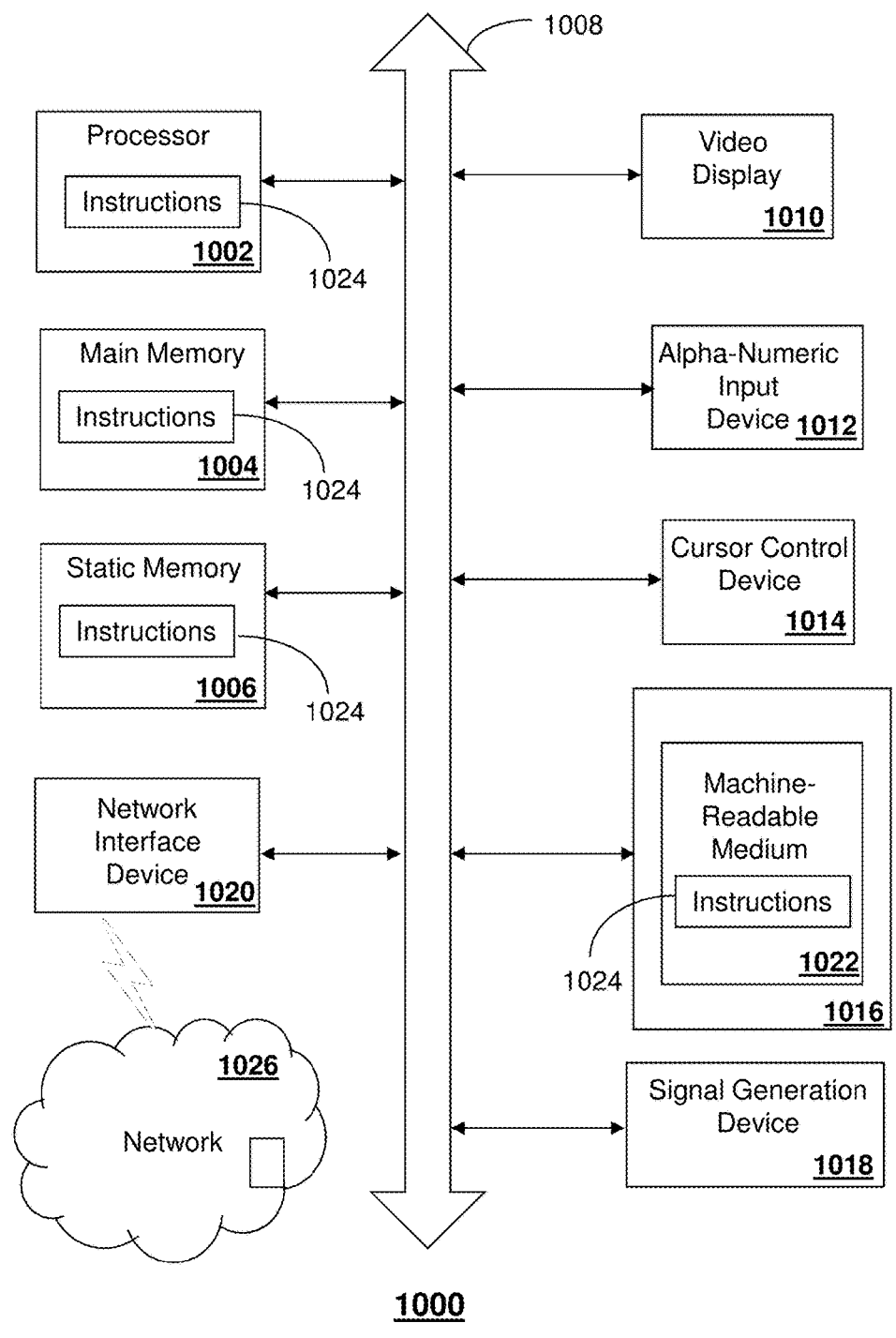
FIG. 10 is a diagrammatic representation of a machine in the form of a computer system within which a set of instructions, when executed, may cause the machine to perform any one or more of the processes described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the MTC-IWF 402, 502 and/or server 430, the CPM 243, the MME 230, the S/P-GW 232, the MSC 218, the SGSN 220, the GGSN 222, and other devices of FIGS. 1-5. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a processing system including a processor, a machine-type communication message directed to a mobile station;
   initiating, by the processing system, a query of a provisioned services repository according to the mobile station;
   determining, by the processing system, a compatibility of the mobile station with an IP Multimedia Subsystem (IMS) architecture based on a reply to the query;
   in response to determining that the mobile station is compatible with the IMS architecture, facilitating, by the processing system, a routing of the machine-type communication message to the mobile station via a network element of an IMS network core; and
   in response to determining that the mobile station is not compatible with the architecture facilitating, by the processing system, a routing of the machine-type communication message to a machine-type communication, interworking function associated with the mobile station, wherein the machine-type communication, interworking function facilitates delivery of the machine-type communication message to the mobile station via an SGs interface of a mobility management entity of an evolved packet core of a long term evolution network, without using a T5 interface between the machine-type communication, interworking function and the mobility management entity.

2. The method of claim 1, further comprising:
   determining, by the processing system, a location of the mobile station; and
   identifying, by the processing system, the machine-type communication, interworking function based on the location of the mobile station.

3. The method of claim 2, wherein the determining of the location of the mobile station further comprises querying, by the processing system, a home subscriber server of the evolved packet core of the long term evolution network based the location of the mobile station.

4. The method of claim 1, wherein the routing of the machine-type communication message to the machine-type communication, interworking function further comprises:
   encapsulating the machine-type communication message within a first protocol, compatible with the machine-type communication, interworking function to obtain a first encapsulated machine-type communication message; and
   processing of the first encapsulated machine-type communication message by the machine-type communication, interworking function to obtain an interworking processed machine-type communication message.

5. The method of claim 4, wherein the routing of the machine-type communication message to the machine-type communication, interworking function further comprises encapsulating the interworking processed machine-type communication message within a second protocol, compatible with the mobility management entity, to obtain a second encapsulated machine-type communication message.

6. The method of claim 5, wherein the second encapsulated machine-type communication message is routed to the mobile station through a radio access network of the long term evolution network.

7. The method of claim 5, wherein encapsulating of the machine-type communication message within the first protocol comprises encapsulating a session initiation protocol within a mobile application part protocol, and wherein the encapsulation of the interworking processed machine-type communication message within the second protocol comprises encapsulating the mobile application part protocol within an SGs application part protocol.

8. A device, comprising:
   a processing system including a processor; and
   a memory that stores executable instructions that, when executed by the processing system, facilitate performance of operations, comprising:
   identifying a machine-type communication message directed to a mobile station;

initiating a query of a subscribed services repository according to the mobile station;

determining a compatibility of the mobile station with an IP Multimedia Subsystem (IMS) architecture according to a reply to the query;

in response to determining that the mobile station is compatible with the IMS architecture, facilitating a forwarding of the machine-type communication message to the mobile station via a network element of an IMS network core; and in response to determining that the mobile station is not compatible with the IMS architecture facilitating a forwarding of the machine-type communication message to a machine-type communication, interworking function associated with the mobile station, wherein the machine-type communication, interworking function facilitates a directing of the machine-type communication message to the mobile station via an SGs interface of a mobility management entity of an evolved packet core of a long term evolution network, without using a T5 interface between the machine-type communication, interworking function and the mobility management entity.

9. The device of claim 8, wherein the operations further comprise:

determining a location of the mobile station; and identifying the machine-type communication, interworking function based on the location of the mobile station.

10. The device of claim 9, wherein the determining of the location of the mobile station further comprises querying a home subscriber server of the evolved packet core of the long term evolution network based the location of the mobile station.

11. The device of claim 8, wherein the forwarding of the machine-type communication message to the machine-type communication, interworking function further comprises:

encapsulating the machine-type communication message within. a first protocol, compatible with the machine-type communication, interworking function to obtain a first encapsulated machine-type communication message; and processing of the first encapsulated machine-type communication message by the machine-type communication, interworking function to obtain an interworking processed machine-type communication message.

12. The device of claim 11, wherein the forwarding of the machine-type communication message to the machine-type communication, interworking function further comprises encapsulating the interworking processed machine-type communication message within a second protocol, compatible with the mobility management entity, to obtain a second encapsulated machine-type communication message.

13. The device of claim 12, wherein the second encapsulated machine-type communication message is routed to the mobile station through a radio access network of the long term evolution network.

14. The device of claim 12, wherein encapsulating of the machine-type communication message within the first protocol comprises encapsulating a session initiation protocol within a mobile application part protocol, and wherein the encapsulation of the interworking processed machine-type communication message within the second protocol comprises encapsulating the mobile application part protocol within an SGs application part protocol.

15. A machine-readable storage medium, comprising executable instructions that, when executed by a processing system including a processor, facilitate performance of operations, comprising:

identifying a machine-type communication message directed to a mobile station;

querying a services repository according to the mobile station;

determining a compatibility of the mobile station with an IP Multimedia Subsystem (IMS) architecture responsive to a reply to the querying of the services repository;

in response to determining that the mobile station is compatible with the IMS architecture, facilitating a forwarding of the machine-type communication message to the mobile station via a network element of an IMS network core; and in response to determining that the mobile station is not compatible with the IMS architecture facilitating a forwarding of the machine-type communication message to a machine-type communication, interworking function associated with the mobile station, wherein the machine-type communication, interworking function facilitates a directing of the machine-type communication message to the mobile station via an SGs interface of a mobility management entity of an evolved packet core of a long term evolution network.

16. The machine-readable storage medium of claim 15, wherein the operations further comprise:

determining a location of the mobile station; and identifying the machine-type communication, interworking function based on the location of the mobile station.

17. The machine-readable storage medium of claim 16, wherein the determining of the location of the mobile station further comprises querying a home subscriber server of the evolved packet core of the long term evolution network based the location of the mobile station.

18. The machine-readable storage medium of claim 15, wherein the forwarding of the machine-type communication message to the machine-type communication, interworking function further comprises:

encapsulating the machine-type communication message within a first protocol, compatible with the machine-type communication, interworking function to obtain a first encapsulated machine-type communication message; and processing of the first encapsulated machine-type communication message by the machine-type communication, interworking function to obtain an interworking processed machine-type communication message.

19. The machine-readable storage medium of claim 18, wherein the forwarding of the machine-type communication message to the machine-type communication, interworking function further comprises encapsulating the interworking processed machine-type communication message within a second protocol, compatible with the mobility management entity, to obtain a second encapsulated machine-type communication message.

20. The machine-readable storage medium of claim 19, wherein encapsulating of the machine-type communication message within the first protocol comprises encapsulating a session initiation protocol within a mobile application part protocol, and wherein the encapsulation of the interworking processed machine-type communication message within the second protocol comprises encapsulating the mobile application part protocol within an SGs application part protocol.

\* \* \* \* \*